United States Patent [19]

Kneier

[11] 4,118,086

[45] Oct. 3, 1978

[54] TACKLE BOX

[75] Inventor: Joseph William Kneier, Chesterland, Ohio

[73] Assignee: Flambeau Products Corporation, Baraboo, Wis.

[21] Appl. No.: 796,422

[22] Filed: May 12, 1977

[51] Int. Cl.² ............................................ A47B 51/00
[52] U.S. Cl. .......................... 312/270; 312/DIG. 33; 312/269
[58] Field of Search ............... 312/DIG. 33, 244, 208, 312/269, 270, 261, 350

[56] References Cited

U.S. PATENT DOCUMENTS

| 1,984,345 | 12/1934 | Kennedy | 312/DIG. 33 |
|---|---|---|---|
| 2,125,989 | 8/1938 | Burch | 312/269 |
| 2,869,961 | 1/1959 | Gomersall | 312/270 |
| 3,330,608 | 7/1967 | Druger, Jr. | 312/244 |
| 3,550,978 | 12/1970 | Magee | 312/350 |
| 3,572,874 | 3/1971 | Hassel | 312/350 |
| 3,606,511 | 9/1971 | Henning et al. | 312/DIG. 33 |
| 3,677,615 | 7/1972 | Hudson | 312/346 |
| 3,985,409 | 10/1976 | Kneier | 312/DIG. 33 |
| 3,992,069 | 11/1976 | Kitterman | 312/244 |

Primary Examiner—Mervin Stein
Assistant Examiner—Victor N. Sakran
Attorney, Agent, or Firm—Allegretti, Newitt, Witcoff & McAndrews

[57] ABSTRACT

A tackle box is disclosed which includes a plurality of storage drawers guidingly supported for selective horizontal extension by removable support means. The removable support means are assembled individually within the tackle box and retained therein by a unique support and retainer system. The individual drawers are retained within the individual support means by means of a unique retaining clip.

12 Claims, 9 Drawing Figures

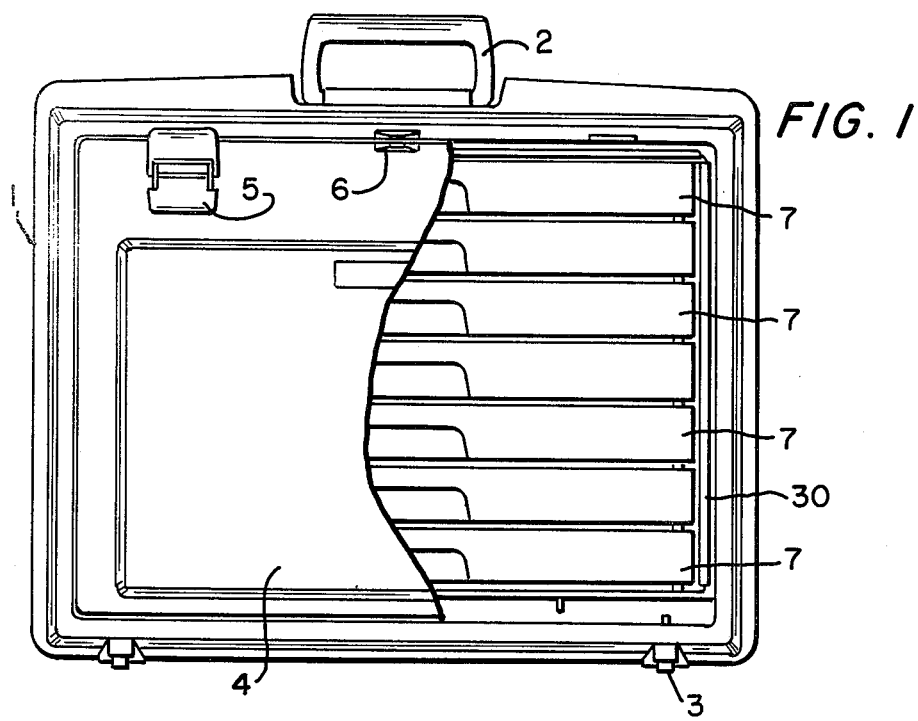
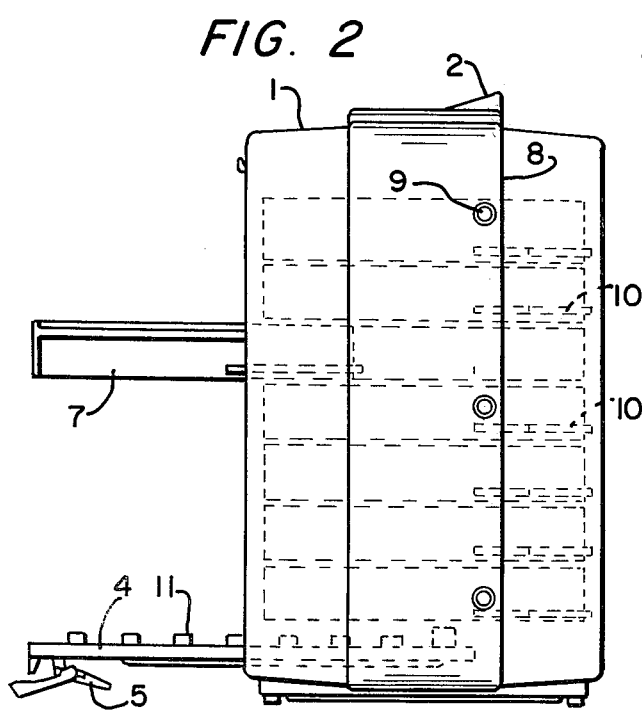
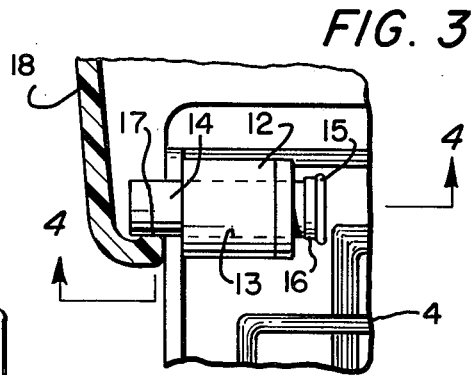
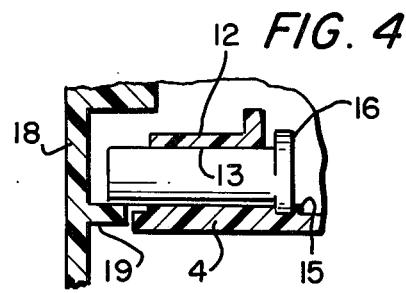

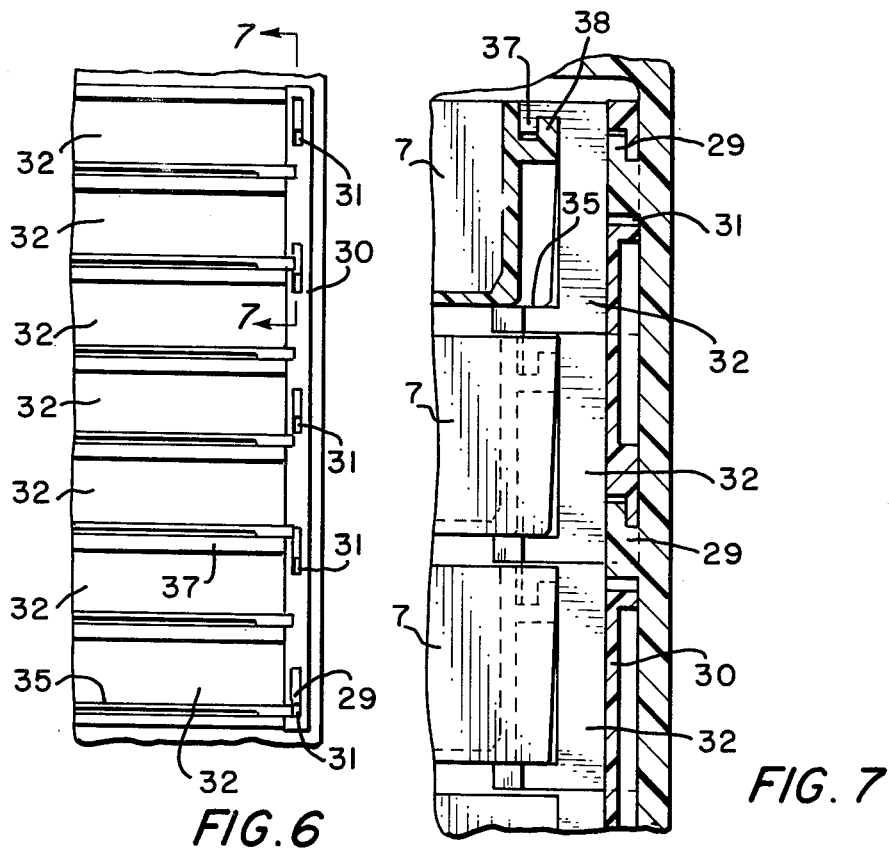
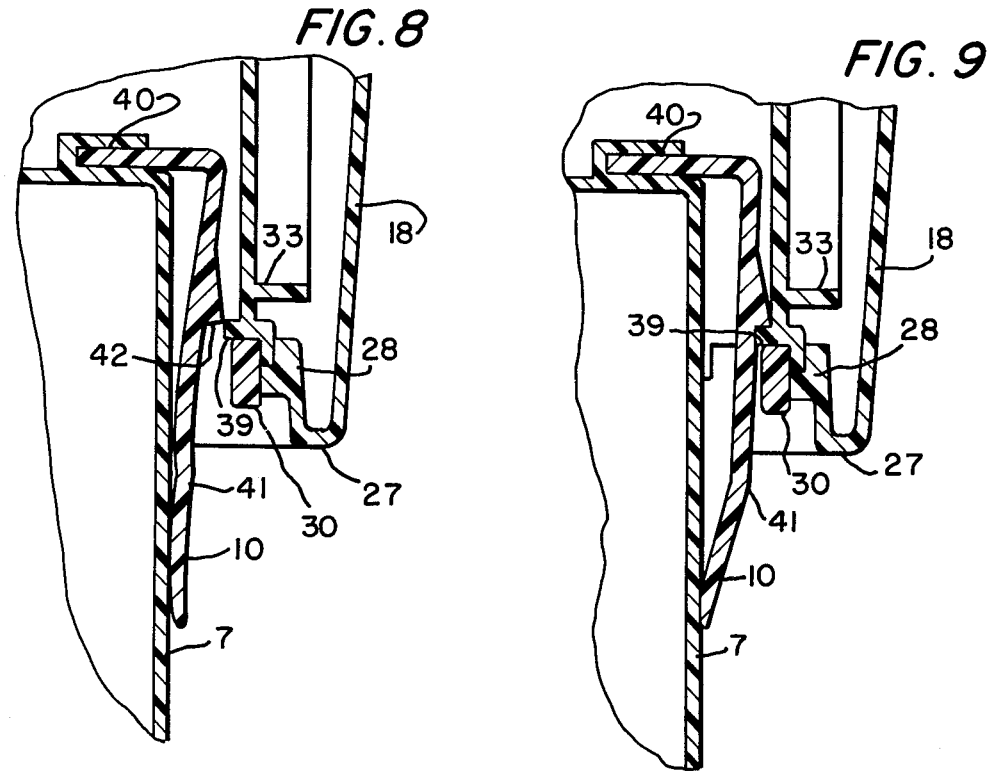

TACKLE BOX

BACKGROUND OF THE INVENTION

The construction of tackle boxes varies widely. However, they are basically designed to accomplish the storage of numerous items of varying sizes and shapes in a convenient and orderly manner and which provides maximum access to the items contained. The construction of the tackle box should be relatively simple, jam-proof, stable, and provide maximum protection to the tackle box contents. These requirements are generally similar to those of tool boxes, and the same containers are often utilized interchangeably for that purpose. One of the popular forms of tackle box is an all-drawer chest for drawers having a drop front panel which serves to enclose the drawers within a box-like container for maximum protection. In metal and wood form, boxes of this nature have long been popular with machinists for storage of their tools of trade.

SUMMARY OF THE INVENTION

I have adapted the well known all drawer tool or tackle box to construction suitable for injection molded plastics. I have invented a new and useful means for retaining, supporting, and securing drawers within a chest of drawers suitable for construction by injection molded plastic means or similar methods. The support means provides for flexibility and selection of drawer depth within the given confines of a tackle box. The object of the invention is to produce a tackle box having drawers which are easily inserted and removed on support slides, which are easily inserted and removed, which in turn are removably secured by a unique slide bar means within the box-like container.

A further object of the invention is to provide an inexpensive means for rapidly and reliably securing the drawers within the confines of the support means while allowing maximum extension of the drawers for access thereto.

A further object of the invention is to provide details of construction suitable for use in an injection molded tackle box which ensure reliability of operation of the drop front, prevent jamming of the drawer contents, and otherwise contribute to the suitability of the tackle box for its intended purpose.

In general, the object of this invention is to provide a tackle box with a drawer assembly comprising: a box-like container having relatively rigid sides, top, bottom, and back; means for access to the interior of said container at its front; means for vertical support disposed on the interior of said container sides; means for horizontal guide extension disposed on said means for vertical support; drawer trays disposed in said means for horizontal guide extension whereby said drawers are supported and movable from a position substantially internal to said container for storage to a position substantially external to said container for selection of drawer contents; and said means for horizontal guide extension being retained on said means for vertical support by a fixed stop at the back of the container and a readily removable retainer bar at the front of the container.

BRIEF DESCRIPTION OF THE DRAWINGS

FIG. 1 is a front elevation of the tackle box, which is partially sectioned to show the drawer configuration;

FIG. 2 is a side elevation view showing the tackle box having one drawer extended and the drop front in its opened position, ghost lines indicate the relative position of the remainder of the tackle box drawers;

FIG. 3 is a plane section showing the hinge pin and retainer construction for the drop front of the tackle box;

FIG. 4 is a partial elevation section taken through plane 4—4 of FIG. 3 and showing further detail of the hinge pin and retainer for the drop front;

FIG. 6 is a partial side elevation view of the front right side of the tackle box as viewed from the inside;

FIG. 7 is a partial elevation section taken at plane 7—7 of FIG. 6;

FIG. 8 is a partial plane section showing the unique drawer retaining clip in its depressed condition for drawer removal;

FIG. 9 is a partial plane section showing the unique drawer retaining clasp in its normal position acting as a drawer stop.

DESCRIPTION OF THE PREFERRED EMBODIMENT

Figure 5:
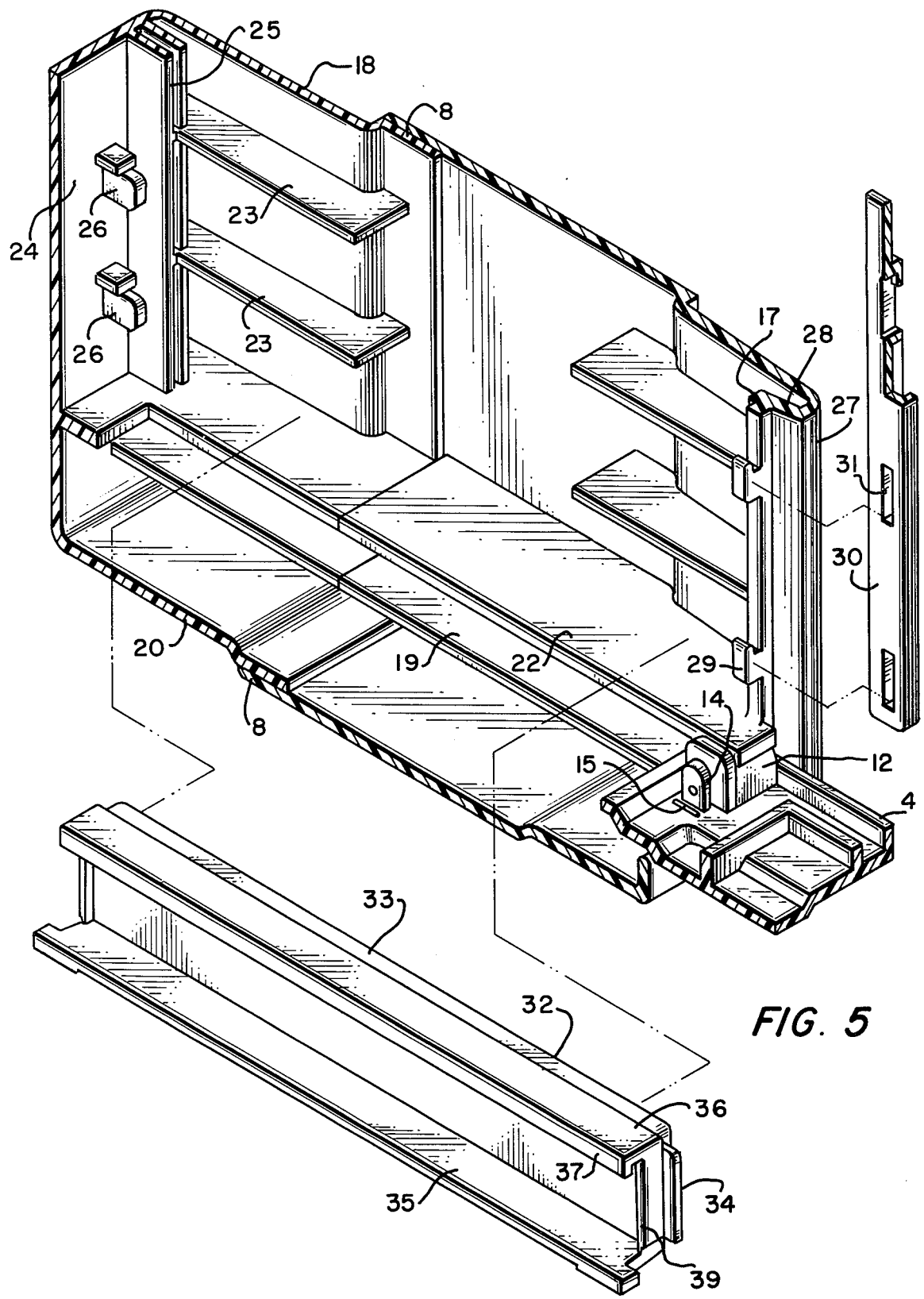
FIG. 5 is a partial exploded perspective internal view of the lower right corner of the tackle box as viewed in FIG. 1.

Referring now to the drawings, FIG. 1 shows a tackle box 1 according to this invention. The tackle box is provided with a handle 2 for transporting the box. The box has four extending foot supports 3 for resting the box on a suitable substantially flat surface. A drop front 4 is provided to complete the enclosure of the tackle box. The drop front is hinged at its lower edge by a means which will be described in detail later. The drop front is shown secured at its upper edge by means of a latch 5. A second latch 5 is not shown because of the partial cut-away. It occupies a symmetrical position on the right side of the tackle box. A lock eye 6 is provided to further secure the contents of the tackle box. A plurality of drawers 7 are shown disposed in the tackle box. When the drop front 4 is lowered, the drawers are readily exposed for their intended use.

FIG. 2 shows a side elevation of the tackle box having the drop front in its lowered and partially recessed position, and one of the drawers 7 extended for purposes of access. A parting flange 8 surrounds the outer periphery of the tackle box. As stated previously, the tackle box is intended to be manufactured by means of injection molded plastics. The parting flange allows the tackle box to be manufactured in two halves consisting essentially of a front half and a back half. The halves are joined at the parting flange 8 by means of several rivets 9. The parting flange assures a relatively tight joint because of its overlapping characteristic and further allows water to run off the box on surfaces sloping away from the joint. The construction also provides and facilitates the necessary draft to allow for easy mold removal.

Shown also on FIG. 2 is the location of the drawers by means of ghost lines in their closed position within the confines of the tackle box. In addition, the location of the spring latch 10, which retains the drawer within the horizontal guide, is shown. One feature of the drop front is its recessed storage within the bottom of the tackle box when it is in its lowered position. Once the drop front has been rotated 90° from its closed position as shown on FIG. 1 to its opened position as shown on FIG. 2, it may be displaced horizontally to a position substantially within the tackle box. This permits the selective use of the drop front as a full or partial tray depending upon available space requirement. The tray permits sorting of drawer contents and other obvious use.

The drop front is provided with projections 11, which assist in retaining the drawers securely in a closed position when the drop front is in its up or closed position. This prevents shifting of the drawers horizontally during transport of the tackle box. The projections also serves as a means of preventing cylindrical items from rolling off the drop front when it is utilized as a shelf.

The unique hinge slide arrangement for the drop front is shown in FIG. 3. A boss 12 is provided in each lower corner of the drop front 4. The boss 12 is provided with a through bore 13 which receives a hinge pin 14. The hinge pin is secured to the through bore by means of a lip 15, best seen in FIG. 4. The lip 15 cooperates with the end flange 16 of the hinge pin. The end flange 16 prevents the hinge pin from passing through the through bore to the left as shown in FIG. 4, and the lip 15 prevents the hinge pin from coming out of the through bore once the hinge pin has been installed. The hinge pin cooperates with the forward edge 17 of the side of the tackle box 18 to prevent the drop front from being withdrawn fully from the confines of the tackle box. Forward edge 17 also acts as one confining surface on which the hinge pin may work. In addition, as shown on FIG. 4, the hinge pin cooperates with a pin guide 19 which extends from the side wall 18 of the tackle box. This forms a second confining surface against which the hinge pin may work. One skilled in the art can appreciate the simplicity of construction of this unique hinge pin arrangement.

FIG. 5 is an exploded partial section isometric view of the lower right hand corner of the tackle box showing the essential details of construction and assembly of a tackle box according to my invention. The bottom of the tackle box 20 is essentially a flat surface except for the raised area of the parting flange 8. The side of the box 18, in addition to the parting flange, is provided with a series of horizontal projections or lands including the pin guide 19 previously mentioned. A base drawer guide land 22 is provided which also serves as an upper guide for the hinge pin boss 12. A series of intermediate drawer guide lands 23 are also provided. Both sides of the box are similar.

The rear of the box 24 is provided with a fixed drawer guide stop 25 which runs from the base drawer guide land to the top of the box. In addition, the rear of the box is provided with individual drawer stops 26. The forward edge 27 of the box is folded back on each side of the front opening to form an opening flange 28. A perpendicular projection from the opening flange 28 is formed to provide a base for hook-like projections 29. A retainer bar 30 is provided with rectangular perforations 31 which cooperate with the hook-like projections 29 to attach the retainer bar to the opening flange 28.

A drawer guide 32 is shown on FIG. 5. The important features of the drawer guide are a back base 33 which sets in and cooperates with the drawer guide lands to position the drawer guide within the tackle box. Each end of the back base 33 is provided with a retaining flange 34. The rear retaining flange cannot be seen in the view shown on FIG. 5. However, it is essentially identical to the forward retaining flange. The drawer guide being essentially symmetrical end for end allows it to be used on either side of the tackle box. Other essential features of the drawer guide are the lower drawer rest flange 35 and the upper drawer guide flange 36. The upper drawer guide flange 36 has a downward projecting guide edge 37 which cooperates with a corresponding or mating drawer guide edge 38 shown on FIG. 7. A latch stop 39 is shown at each end of the drawer guide.

In assembly, the drawer guides 32 are disposed upon a drawer guide land having their back base 33 resting on the land. The rear edge of the drawer guide is inserted first so that the rear retaining flange is disposed between fixed drawer guide stop 25 and the side wall 21. After all of the drawer guides for one side of the tackle box are inserted, the retainer bar 30 is placed over the hook-like projections 29 and pushed downward to secure the retainer bar 30 on the hook-like projections. The retainer bar 30 is shown in place on FIG. 6. The retainer bar cooperates with the forward retainer flange 34 to securely hold the drawer guide 32 in place in a tackle box. When both sides of the drawer have had the drawer guides installed, the drawers 7 may be placed in position relative to the drawer guide as shown on FIG. 7 and inserted in the tackle box. The drawers 7, as I indicated before, are provided with a drawer guide edge 38 which cooperates with guide edge 37.

The cooperation of the guide edges and the cooperation of bottom of the drawer with the drawer rest flange 35 securely holds the drawer against vertical movement with the tackle box. The construction, however, allows the drawers to freely move horizontally outward from the box for easy access.

In order to prevent the drawers from accidentally being displaced too far horizontally and, therefore, falling out of the tackle box, a spring latch 10 is provided on the back edge of each side of the drawer. The spring latch can best be seen on FIGS. 8 and 9. The spring latch is disposed in a latch pocket 40 on the back edge of the drawer. The spring latch is essentially a L-shaped member. The latch has slight bend at one edge towards the front of the drawer at point 41. The latch also has a raised stop 42 which cooperates with latch stop 39 as shown on FIG. 9 to prevent the drawer from being fully withdrawn from the drawer guide 32. The position of the spring latch 10 relative to the drawer is seen on FIG. 2. The spring latch is a narrow strip of moderately stiff but resilient plastic. To release the spring latch, it is merely necessary to depress the spring latch in the direction towards center of the drawer by applying pressure at point 41. The deflection of the spring latch allows the raised stop 42 to clear latch stop 39 and thereby allows the drawer to be removed. The shape of the spring latch, shown on FIG. 8, allows the drawer to be reinserted within the drawer guide without again depressing the spring latch. The ramping action of the raised stop 42 provides the necessary force to depress or deform the spring latch as it passes the latch stop on insertion of the drawer.

The advantage of the unique retainer bar construction, removable and reversible drawer guide construction, the simple and reliable spring latch construction, and the drop front pin guide will be readily appreciated by one skilled in the art.

It should be understood that the present disclosure is for purpose of illustration only, and that applicant's invention is limited only by the scope of the claims.

I claim:

1. A tackle box comprising:

a boxlike container having relatively rigid sides, top, bottom, and back;

means for access to the interior of said container at its front;

means for vertical support disposed on the interior of said container sides;

means for horizontal guide extension disposed on said means for vertical support and having an end facing said means for access;

drawer trays disposed in said means for horizontal guide extension whereby said drawers are supported and movable from a position substantially internal to said container for storage to a position substantially external to said container for selection of drawer contents; and said means for horizontal guide extension being retained on said means for vertical support by a fixed stop at the back of the container and retainer bar means at the front of the container and extending in overlying relationship to said end of said means for horizontal guide extension, said retainer bar means including means on said container for permitting ready removal of said retainer bar means.

2. The tackle box of claim 1 further comprising:

a front closure having a first position forming a closure of the container;

said front closure having a second position substantially horizontal in a plane near to said container bottom and projecting forward of said container bottom to form a shelf; and said front closure having a third position substantially horizontal in a plane near to said container bottom and substantially above said container bottom but below said drawer trays in which position said front closure is stored.

3. The tackle box of claim 1 wherein:

said means for horizontal guide extension comprises separate means for each drawer side.

4. The tackle box of claim 1 further comprising:

drawer tray stop means for selectively preventing the disassociation of said drawer trays with said means for horizontal guide extension.

5. The tackle box of claim 1 wherein:

said removable retainer bar means is mounted on hook projections extending from said container; and said hook projections cooperating with rectangular bores in said retainer bar means.

6. The tackle box of claim 2 further comprising:

a plurality of hinge pins disposed at the lower inside side corners of said front closure when said front closure is in its first position;

said hinge pins cooperating with said container to form a hinge whereby said front closure may be moved from its first position to its second position by rotation about said hinge pins; and said hinge pins further cooperating with said container to guide the front closure horizontally within said container when said front closure is moved from said second position to said third position.

7. The tackle box of claim 2 wherein said front closure includes at least one projection thereon extending toward at least one of said drawer trays when said front closure is in said first position.

8. The tackle box of claim 3 wherein:

said means for horizontal guide extension comprises at least one substantially elongated rectangular member having a base which cooperates with said means for vertical support, a drawer rest flange at its lower edge, a drawer guide flange at its upper edge, a retaining flange at each end extending forwardly and rearwardly from said base, and a latch stop at each end extending inwardly toward said drawer trays.

9. The tackle box of claim 8 wherein:

said drawer trays are provided with a drawer guide which cooperates with said drawer guide flange and said drawer trays further cooperate with said drawer rest flange.

10. The tackle box of claim 9 wherein:

said means for horizontal guide extension are symmetrical end for end and may be utilized on either side of the tackle box.

11. The tackle box of claim 4 wherein:

said drawer tray stop means are substantially L-shaped having one leg inserted in a mounting means on said drawer tray; and said drawer tray stop means having a second leg which is slightly bent to provide resilient relief and which is provided with a releasable stop projection which cooperates with said means for horizontal guide extension.

12. A tackle box comprising:

a boxlike container having relatively rigid sides, top bottom, and back;

means for access to the interior of said container at its front;

means for vertical support disposed on the interior of said container sides;

means for horizontal guide extension disposed on said means for vertical support;

drawer trays disposed in said means for horizontal guide extension whereby said drawers are supported and movable from a position substantially internal to said container for storage to a position substantially external to said container for selection of drawer contents;

said means for horizontal guide extension being retained on said means for vertical support by a fixed stop at the back of the container and a readily removable retainer bar at the front of the container;

a front closure having a first position forming a closure of the container, a second position substantially horizontal in a plane near to said container bottom and projecting forward of said container bottom to form a shelf, and a third position substantially horizontal in a plane near to said container bottom and substantially above said container bottom, but below said drawer trays in which position said front closure is stored; and a plurality of hinge pins disposed at the lower inside side corners of said front closure when said front closure is in said first position, said hinge pins cooperating with said container to form a hinge whereby said front closure may be moved from said first position to said second position by rotation about said hinge pins, said hinge pins further cooperating with said container to guide said front closure horizontally within said container when said front closure is moved from said second position to said third position.

* * * * *